(12) United States Patent
Boulton

(10) Patent No.: US 11,180,115 B2
(45) Date of Patent: Nov. 23, 2021

(54) CONTROLLING VEHICLE OPERATIONS BASED ON VEHICLE INFORMATION

(71) Applicant: BlackBerry Limited, Waterloo (CA)

(72) Inventor: Adam John Boulton, Wirral (GB)

(73) Assignee: BlackBerry Limited, Waterloo (CA)

( * ) Notice: Subject to any disclaimer, the term of this patent is extended or adjusted under 35 U.S.C. 154(b) by 307 days.

(21) Appl. No.: 16/233,204

(22) Filed: Dec. 27, 2018

(65) Prior Publication Data
US 2020/0207308 A1 Jul. 2, 2020

(51) Int. Cl.
| | |
|---|---|
| *B60R 25/24* | (2013.01) |
| *B60Q 9/00* | (2006.01) |
| *B60R 25/04* | (2013.01) |
| *G01C 21/34* | (2006.01) |
| *G06Q 40/08* | (2012.01) |
| *G06Q 40/00* | (2012.01) |
| *G07C 5/00* | (2006.01) |

(52) U.S. Cl.
CPC .............. *B60R 25/241* (2013.01); *B60Q 9/00* (2013.01); *B60R 25/04* (2013.01); *G01C 21/34* (2013.01); *G06Q 40/08* (2013.01); *G06Q 40/10* (2013.01); *G07C 5/008* (2013.01)

(58) Field of Classification Search
CPC ......... B60R 25/241; B60R 25/04; B60Q 9/00; G01C 21/34; G06Q 40/08; G06Q 40/10; G06Q 10/00; G07C 5/008
See application file for complete search history.

(56) References Cited

U.S. PATENT DOCUMENTS

| | | | |
|---|---|---|---|
| 2007/0200663 A1 | 8/2007 | White et al. | |
| 2016/0185358 A1 | 6/2016 | Todasco et al. | |
| 2017/0187707 A1* | 6/2017 | Miu ..................... | H04W 12/06 |
| 2017/0206607 A1 | 7/2017 | Slater et al. | |
| 2018/0215392 A1 | 8/2018 | Kosaka et al. | |
| 2020/0207306 A1 | 7/2020 | Boulton | |
| 2020/0334485 A1* | 10/2020 | Sameer ..................... | G06T 3/20 |

FOREIGN PATENT DOCUMENTS

| | | | |
|---|---|---|---|
| DE | 2012205593 | | 10/2013 |
| JP | 2017043190 | | 3/2017 |
| JP | 2017043190 | A * | 3/2017 |
| WO | 2011/096871 | | 8/2011 |

OTHER PUBLICATIONS

PennDOT License Types and Restrictions (Year: 2018).*
Machine Translation of JP-2017043190-A (Year: 2017).*
Extended European Search Report issued in European Application No. 19218364.8 dated May 26, 2020, 9 pages.
Extended European Search Report issued in European Application No. 19218363.0 dated Mar. 6, 2020, 7 pages.

* cited by examiner

*Primary Examiner* — Alan D Hutchinson
(74) *Attorney, Agent, or Firm* — Fish & Richardson P.C.

(57) ABSTRACT

Systems, methods, and software can be used to control vehicle operation based on vehicle information. In some aspects, a method is disclosed comprising: transmitting, from a vehicle, a vehicle information request, wherein the vehicle information request comprises an identification (ID) of the vehicle; receiving, at the vehicle, a vehicle information response, wherein the vehicle information response comprises vehicle information of the vehicle; and controlling, by at least one hardware processor on the vehicle, an operation of the vehicle based on the vehicle information.

20 Claims, 2 Drawing Sheets

CONTROLLING VEHICLE OPERATIONS BASED ON VEHICLE INFORMATION

TECHNICAL FIELD

The present disclosure relates to controlling vehicle operations based on vehicle information.

BACKGROUND

In some cases, a vehicle can include one or more sensors. The one or more sensors can generate inputs, e.g., video or audio inputs, that reflect the surroundings of the vehicle. Examples of the sensors can include cameras, microphones, laser, radar, ultrasonic, light detection and ranging (LIDAR) or any other sensors.

The vehicle may also include an autopilot processing platform that generates autopilot commands. The autopilot processing platform can receive inputs from one or more sensors installed on the vehicle. The autopilot processing platform may include one or more autopilot processors that generate autopilot commands based on these inputs. These autopilot commands are directed to components of the vehicle to control the movements of the vehicle. Examples of the components include without limitation steering wheel, brakes, accelerator, lights, and the like. Examples of the autopilot commands include without limitation accelerate, decelerate, turn left or right, signal, and the like. A vehicle equipped with the autopilot processing platform can be referred to as a self-driving vehicle, a driver-less vehicle, an autonomous or semi-autonomous vehicle, or an autopilot vehicle.

DESCRIPTION OF DRAWINGS

Like reference numbers and designations in the various drawings indicate like elements.

DETAILED DESCRIPTION

In some cases, government or regulation entity may require a vehicle to have a valid registration for the vehicle to be operated on the road. A vehicle may lose a status of a valid registration if the tax of the vehicle is overdue or the vehicle has an expired inspection. A driver operating a vehicle without valid registration can encounter legal troubles, safety issues, or both.

Figure 1:
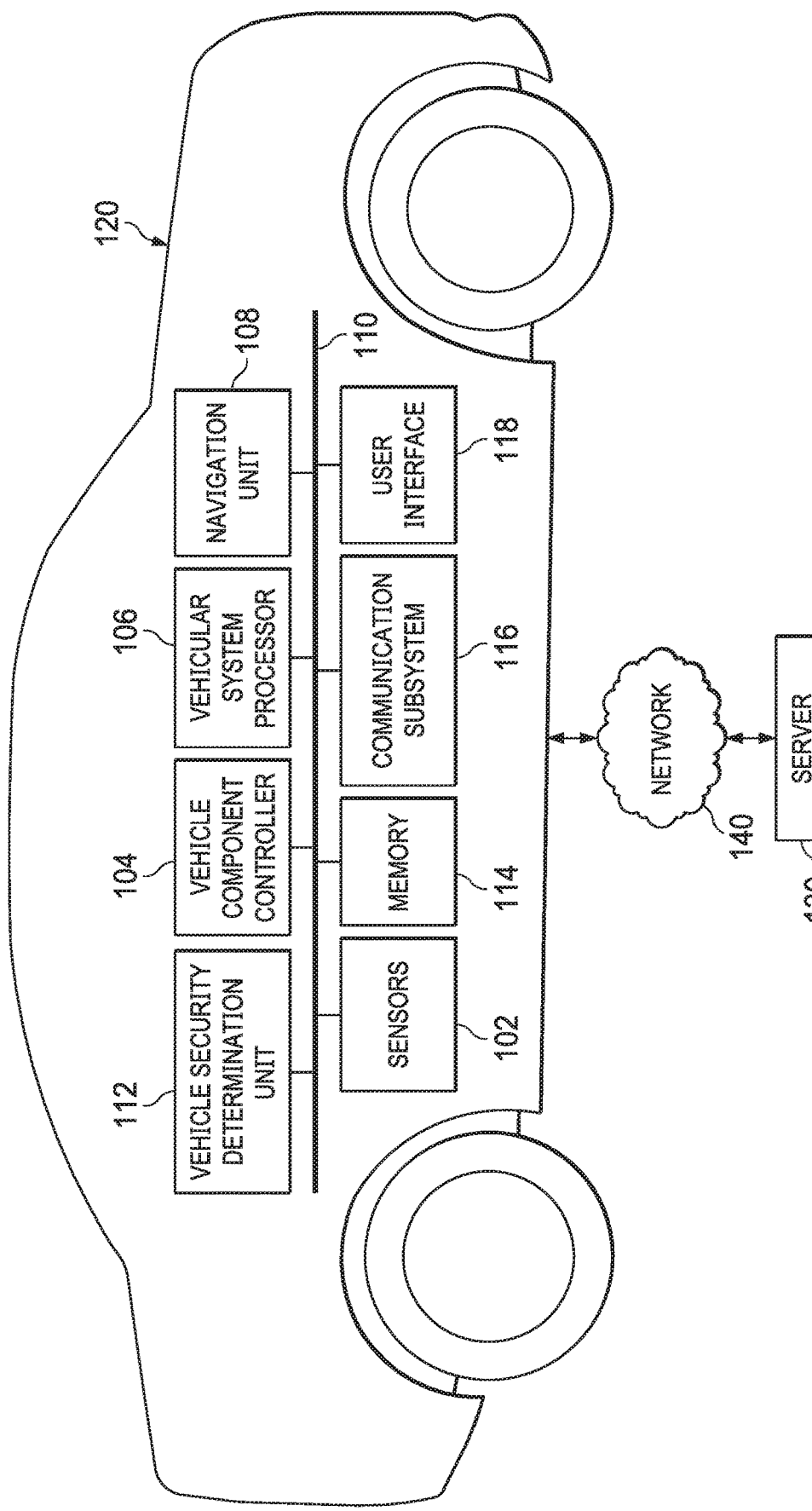
FIG. 1 is a schematic diagram showing an example communication system that controls vehicle operations based on vehicle information, according to an implementation.
Figure 2:
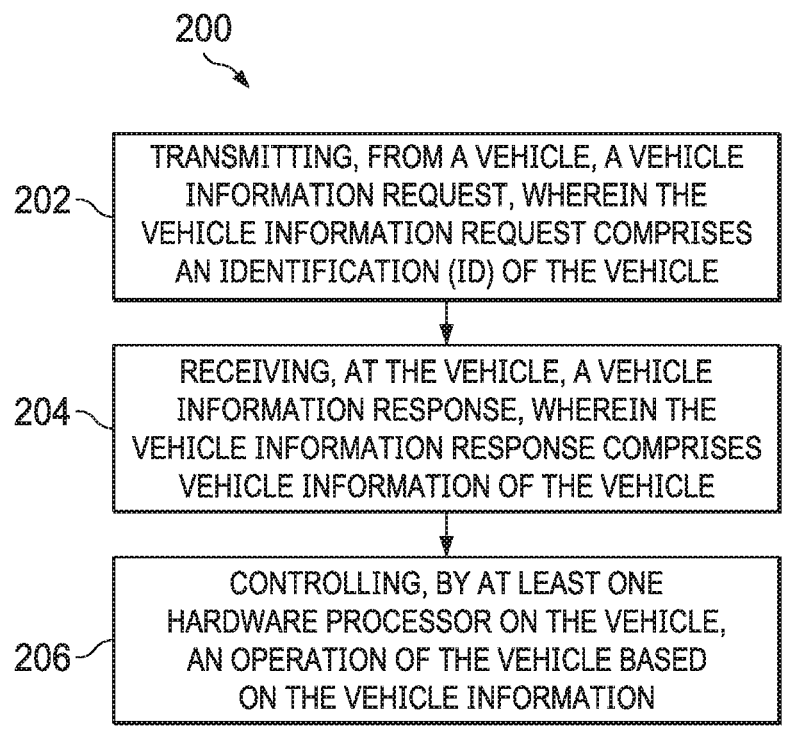
FIG. 2 is a flow diagram showing an example method that controls vehicle operations based on vehicle information, according to an implementation.
Figure 3:
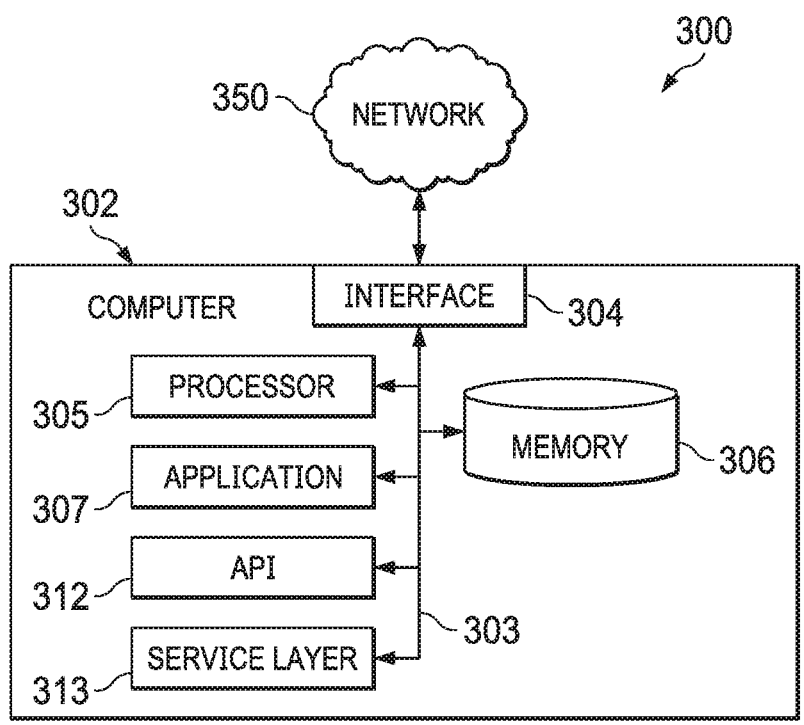
FIG. 3 is a high-level architecture block diagram of a computing system, according to an implementation.

In some implementation, the driving operation of the vehicle can be controlled based on the vehicle information of the vehicle. A driving operation, e.g., starting the engine, shifting the gear (e.g., from park or neutral to forward or reverse drive), or otherwise moving the vehicle, can be prevented if the vehicle determines that the vehicle does not have valid registration. In one example implementation, the vehicle can send a vehicle information request and receive the up-to-date vehicle information of the vehicle. The vehicle information can include the tax information, the inspection information or other information that indicates whether the vehicle is authorized to travel on the road. The vehicle can control the operation of the vehicle, including preventing or limiting the driving operation, based on the vehicle information. FIGS. 1-3 and associated descriptions provide additional details to these implementations. This approach improves the saftey of the driver in operating the vehicle and overall road safety. This approach also enables an enterprise, e.g., a commercial fleet operator, to flexibly control the operations of its vehicles based on up-to-date vehicle information of the vehicles.

FIG. 1 is a schematic diagram showing an example communication system 100 that controls vehicle operations based on vehicle information, according to an implementation. At a high level, the example communication system 100 includes a vehicle 120 and a server 130 that are communicatively coupled over a network 140.

The vehicle 120 can include a motor vehicle (e.g., automobile, car, truck, bus, motorcycle, etc.), aircraft (e.g., airplane, unmanned aerial vehicle, unmanned aircraft system, drone, helicopter, etc.), spacecraft (e.g., spaceplane, space shuttle, space capsule, space station, satellite, etc.), watercraft (e.g., ship, boat, hovercraft, submarine, etc.), railed vehicle (e.g., train, tram, etc.), and other types of vehicles including any combinations of any of the foregoing, whether currently existing or after arising. In the illustrated example, the vehicle 120 includes one or more sensors 102, a vehicle component controller 104, a vehicular system processor 106, a communication subsystem 116, a user interface 118, memory 114, a vehicle security determination unit 112, and a navigation unit 108 that are connected to a bus 110.

The vehicle 120 includes one or more sensors 102 that detect or measure information for the vehicle 120. Examples of the sensors 102 can include devices that capture environmental information that is external to the vehicle 120, such as cameras, microphones, radars, laser transmitters and receivers, and the like. These sensors can provide environmental inputs for an autopilot processing platform operating on the vehicle 120 to make autopilot decisions. Examples of the sensors 102 can also include devices that capture information that is internal to the vehicle 120, such as monitors for components such as engine, battery, fuel, electronic system, cooling systems, and the like. These sensors can provide operation status and warnings to the autopilot processing platform operating on the vehicle 120. Examples of the sensors 102 can also include devices that can receive or detect biometric input from a driver. The biometric input can be used by the vehicle 120 to authenticate the driver. FIG. 2 and associated descriptions provide additional details of these implementations.

The vehicle 120 includes a navigation unit 108. The navigation unit 108 represents an application, a set of applications, software, software modules, hardware, or any combination thereof that can be configured to generate a driving route of the vehicle 120. In one example, the navigation unit 108 can include a Global Positioning System (GPS) receiver. In some cases, the navigation unit 108 can generate a driving route based on vehicle information of the vehicle. FIG. 2 and associated descriptions provide additional details of these implementations.

The vehicle 120 includes a vehicle component controller 104. Although illustrated as a vehicle component controller 104 in FIG. 1, the vehicle 120 can include two or more vehicle component controllers 104. The vehicle component controller 104 represents a controller that controls the operation of a component on the vehicle 120. Examples of the components can include engine, accelerator, brake, radiator, battery, steering wheel, transmission system, cooling system, electrical system, and any other components of the vehicle 120. The vehicle component controller 104 can operate a respective component automatically, according to input from the vehicular system processor 106, or a combination thereof. In some implementations, the vehicle component controller 104 can include a data processing apparatus.

The vehicular system processor 106 can include one or more processing components (alternatively referred to as "processors" or "central processing units" (CPUs)) configured to execute instructions related to one or more of the processes, steps, or actions for the autopilot processing platform operating on the vehicle 120. Generally, the vehicular system processor 106 executes instructions and manipulates data to perform the operations of the driving processing platform. The vehicular system processor 106 can receive inputs from the sensors 102 and generate commands to the vehicle component controller 104. In some cases, the vehicular system processor 106 can perform autopilot operations. In some cases, the vehicular system processor 106 can include a data processing apparatus.

The communication subsystem 116 can be configured to provide wireless or wireline communication for data or control information of the vehicle 120. For example, the communication subsystem 116 can support transmissions over wireless local area network (WLAN or WiFi), near field communication (NFC), infrared (IR), Radio-frequency identification (RFID), Bluetooth (BT), Universal Serial Bus (USB), or any other short-range communication protocols. The communication subsystem 116 can also support Global System for Mobile communication (GSM), Interim Standard 95 (IS-95), Universal Mobile Telecommunications System (UMTS), CDMA2000 (Code Division Multiple Access), Evolved Universal Mobile Telecommunications System (E-UMTS), Long Term Evaluation (LTE), LTE-Advanced, 5G, or any other radio access technologies. The communication subsystem 116 can include, for example, one or more antennas, a receiver, a transmitter, a local oscillator, a mixer, and a digital signal processing (DSP) unit. In some implementations, the communication subsystem 116 can support multiple input multiple output (MIMO) transmissions. In some implementations, the receivers in the communication subsystem 116 can be an advanced receiver or a baseline receiver.

The user interface 118 can include, for example, any of the following: one or more of a display or touch screen display (for example, a liquid crystal display (LCD), a light emitting diode (LED), an organic light emitting diode (OLED), or a micro-electromechanical system (MEMS) display), a keyboard or keypad, a trackball, a speaker, or a microphone. The user interface 118 can also include I/O interface, for example, a universal serial bus (USB) interface.

The memory 114 can be a computer-readable storage medium. Examples of the memory 114 include volatile and non-volatile memory, magnetic media, optical media, random access memory (RAM), read-only memory (ROM), removable media, and others. The memory 114 can store an operating system (OS) of the vehicle 120 and various other computer-executable software programs for performing one or more of the processes, steps, or actions described above.

The vehicle security determination unit 112 represents an application, a set of applications, software, software modules, hardware, or any combination thereof that can be configured to generate vehicle operation control commands based on vehicle information of the vehicle 120. In some cases, the vehicle security determination unit 112 can generate a vehicle information request, send the vehicle information request to the communication subsystem 116 to transmit the vehicle information request to the server 130. The communication subsystem 116 can receive a vehicle information response from the server 130 and forward it to the vehicle security determination unit 112. The vehicle security determination unit 112 can generate vehicle operation control commands that prevent or limit the driving operation of the vehicle 120 according to the vehicle information of the vehicle included in the vehicle information response. The vehicle security determination unit 112 can direct the vehicle operation control commands to the vehicle component controller 104, the vehicular system processor 106, or a combination thereof, to control the vehicle operation of the vehicle 120. FIG. 2 and associated descriptions provide additional details of these implementations. In some implementation, the vehicle security determination unit 112 can be implemented as a separate software program or part of a software program that is executed by the vehicular system processor 106.

As illustrated, the bus 110 provides a communication interface for components of the autopilot processing platform operating on the vehicle 120. In some cases, the bus 110 can be implemented using a Controller Area Network (CAN) bus.

Some of the components of the vehicle 120 can be implemented on a device that is associated with the vehicle 120. For example, the vehicle security determination unit 112 can be implemented on a portable electronic device that is connected with the vehicle 120 over NFC, BT, USB, or any other wireless or wireline communication technologies. The portable electronic device may include, without limitation, any of the following: endpoint, computing device, mobile device, mobile electronic device, user device, mobile station, subscriber station, portable electronic device, mobile communications device, wireless modem, wireless terminal, or other electronic device. Examples of an endpoint may include a mobile device, IoT (Internet of Things) device, EoT (Enterprise of Things) device, cellular phone, personal data assistant (PDA), smart phone, laptop, tablet, personal computer (PC), pager, portable computer, portable gaming device, wearable electronic device, health/medical/fitness device, camera, or other mobile communications devices having components for communicating voice or data via a wireless communication network.

The server 130 represents an application, a set of applications, software, software modules, hardware, or any combination thereof that can be configured to receive the vehicle information request and send the vehicle information response. The server 130 can be a server operated or controlled by a government or entity that stores or has access to vehicle information of drivers. The server 130 can also be an enterprise server operated by an enterprise that owns or controls the vehicle 120. The enterprise server can send queries to other servers that store or have access to vehicle information of vehicles. Though illustrated as one server, the server 130 can include multiple servers, servers operated in a distributing computing platform, servers operated in a cloud computing platform, or any combinations thereof.

The example communication system 100 includes the network 140. The network 140 represents an application, set of applications, software, software modules, hardware, or combination thereof, that can be configured to transmit data between the server 130 and the vehicle 120 in the system 100. The network 140 includes a wireless network, a wireline network, or a combination thereof. For example, the network 140 can include one or a plurality of radio access networks (RANs), core networks (CNs), and external networks. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (E-UMTS), Long Term Evaluation (LTE), LTE-Advanced, 5G, or any other radio access technologies. In some instances, the core networks may be evolved packet cores (EPCs).

A RAN is part of a wireless telecommunication system which implements a radio access technology, such as UMTS, CDMA2000, 3GPP LTE, 3GPP LTE-A, and 5G. In many applications, a RAN includes at least one base station. A base station may be a radio base station that may control all or at least some radio-related functions in a fixed part of the system. The base station may provide radio interface within their coverage area or a cell for a mobile device to communicate. The base ston may be distributed throughout the cellular network to provide a wide area of coverage. The base station directly communicates to one or a plurality of mobile devices, other base stations, and one or more core network nodes.

While elements of FIG. 1 are shown as including various component parts, portions, or modules that implement the various features and functionality, nevertheless, these elements may, instead, include a number of sub-modules, third-party services, components, libraries, and such, as appropriate. Furthermore, the features and functionality of various components can be combined into fewer components, as appropriate.

FIG. 2 is a flow diagram showing an example method 200 that controls vehicle operations based on vehicle information, according to an implementation. The method 200 can be implemented by the entities shown in FIG. 1, including, for example, the vehicle 120. The method 200 shown in FIG. 2 can also be implemented using additional, fewer, or different entities. Furthermore, the method 200 shown in FIG. 2 can be implemented using additional, fewer, or different operations, which can be performed in the order shown or in a different order. In some instances, an operation or a group of operations can be iterated or repeated, for example, for a specified number of iterations or until a terminating condition is reached.

At 202, the vehicle transmits a vehicle information request. In some cases, the vehicle information request can be transmitted to a server. The server can be operated by a local, federal/national, or international government entity/ organization that stores vehicle information. The server can receive inquiry of vehicle information of a vehicle and respond with the vehicle information. In these or other cases, the vehicle information request can be formatted according to the communication protocol used by the entity or organization for query. For example, a government entity can use a web server to respond to the query of vehicle information of a vehicle. The vehicle information request can thus be a Hypertext Transfer Protocol (HTTP) message or a Hypertext Transfer Protocol Secure (HTTPS) message.

In some cases, the server can be operated by an enterprise entity. The enterprise server can operate as an intermediary and further query other servers, e.g., servers operated by government entities, for vehicle information of a vehicle. This approach may reduce the complexity of generating the vehicle information request and simplify the implementation of the vehicle. For example, different government entities (e.g., state or country) can have different mechanisms and use different communication protocols for querying and releasing of vehicle information of a vehicle. The enterprise server can receive the vehicle information request, identify the specific government server that can be accessed to query the vehicle information, and generate a specific query according to the communication protocol used by the specific government server. The enterprise server can receive the vehicle information of the vehicle from the government server and generate a response that encapsulates the vehicle information. Alternatively or additionally, the vehicle can select the server of a particular government entity (e.g., a particular state or country) based on the identification information of the vehicle discussed below, and send the vehicle information request to the selected server according to the communication protocol used by the selected server. In some cases, e.g., for vehicles that are owned by a commercial fleet enterprise, the enterprise server can store the vehicle information of its vehicles, and respond to the vehicle information request sent by one of its vehicles. In some cases, the enterprise server and the vehicle can establish a secure communication channel, perform a security procedure, e.g., a Transport Layer Security (TLS) handshake procedure, or a combination thereof, before exchanging the vehicle information request and vehicle information response messages.

The vehicle information request is generated by the vehicle. In some cases, the generation and transmission of the vehicle information request can be triggered by a user input to the vehicle. The user input can be a user interaction that initiates a driving operation of the vehicle. Examples of the user interaction can include: unlocking a door of the vehicle, opening a door of the vehicle, turning on the vehicle, starting the engine of the vehicle, shifting the gear of the vehicle from parking to drive. Alternatively or additionally, the user input can be received through a user interface of the vehicle, e.g., a tap on a touchscreen in the vehicle or a voice command. In some cases, the vehicle can perform an authentication procedure after receiving the user interaction. The authentication can be performed based on a biometric input from the user. Examples of the biometric input can include fingerprint, palm print, hand geometry, facial image, retina scan, iris scan, voice, signature, gait, or other inputs of biometric data input. The authentication can also be based on password or other security credentials. In some cases, the vehicle can generate and transmit the vehicle information request after the vehicle authenticates that the user input is received from an authorized driver of the vehicle.

The vehicle includes an identification (ID) of the vehicle in the vehicle information request. The ID can be a license plate information of the vehicle, e.g., the license plate number and the associated government entity (e.g., state or country) that issued the license plate. The ID can also be a Vehicle Identification Number (VIN) or any other data that identifies the vehicle. Based on the ID, the vehicle or the enterprise server can identify the server of the government entity that can receive and respond to the vehicle information request.

In some cases, the vehicle information request can indicate the type of information requested by the vehicle information request. For example, the vehicle information request can indicate one or more types of information, e.g., inspection data, tax data, insurance data, requested by the vehicle information request.

At 204, the vehicle receives a vehicle information response. The vehicle information response includes vehicle information of the vehicle. As discussed previously, the vehicle information response can be sent by a server operated by a government/organization that stores the vehicle information of the vehicle, or by an enterprise server that stores or further queries the requested vehicle information.

The vehicle information of the vehicle can include information indicating whether the vehicle has a valid registration with the local government. For example, the vehicle information can include inspection data of the vehicle, e.g., the most recent date that the vehicle passed the inspection, the expiration date of the current inspection, or a combination thereof. The vehicle information can also include the tax data of the vehicle, e.g., the most recent date that the vehicle tax was paid for the vehicle, the next due date of the vehicle tax for the vehicle, or a combination thereof.

The vehicle information of the vehicle can also include supplemental information of the vehicle. The supplemental information can include make, color, model of the vehicle, or any combinations thereof. The supplemental information can be outputted by the vehicle in a user interface of the vehicle. This approach enables a driver to verify that the ID of the vehicle matches the vehicle. In some cases, the driver can initiate a command through the user interface to indicate that the vehicle is verified, or that a mismatch occurs and the vehicle should not be driven pending further investigation.

The supplemental information can also include category information of the vehicle. For example, the supplemental information can indicate a class of the vehicle as defined by government agency or other regulatory bodies. For example, in United States, a class C vehicle is a single vehicle weighing 26,001 or more pounds and the unit being towed is less than 10,000 pounds (lbs), while a class A vehicle is a combination of vehicles with a Gross Vehicle Weight Rating (GVWR) of 26,001 lbs. or more, provided the GVWR of the vehicle or vehicles being towed is in excess of 10,000 lbs. In the United Kingdom, motor vehicles of categories C1, C, D1, D, C1E, CE, D1E or DE are defined (see e.g., https://www.gov.uk/guidance/changes-to-the-driving-licence-and-categories). Alternatively or additionally, the supplemental information can indicate the estimate weight of the vehicle, with or without load.

In some implementations, the enterprise server discussed previously stores or has access to the supplemental information of the vehicle. The enterprise server can send the supplemental information to the vehicle in response to the vehicle information request, in the same vehicle information response message as the registration information of the vehicle or in a different message. Alternatively or additionally, some of the supplemental information can be stored in the vehicle, and can be outputted in a user interface, together with the registration information received in the vehicle information response or in response to a user input.

Following is an example of the vehicle information that can be included in the vehicle information response:

```
{
"taxed": false,
"mot": true,
"colour": "BLACK",
"dateOfFirstRegistration": "13 JUNE 2012",
"yearOfManufacture": "2012",
"make": "HONDA",
"model": "CR-V",
"fuelType": "DIESEL",
"sixMonthRate": "",
"twelveMonthRate": "",
"motDetails": "Expires: 13 June 2019",
```

-continued

```
"vin": "SHSRE6770CU014453",
"transmission": "MANUAL",
"co2Emissions": "",
"cylinderCapacity": "2199 cc",
"numberOfDoors": "5",
"typeApproval": "",
"wheelPlan": "",
"revenueWeight": "",
"taxDetails": "Tax due: 10 MAY 2018",
"taxStatus": "Tax due"
}
```

At 206, the vehicle controls the operation of the vehicle based on the vehicle information. In one example, the vehicle can prevent a driving operation of the vehicle, e.g., shutting down the engine, applying the break, or using another mechanism that prevents the vehicle from moving, if the vehicle determines, based on the vehicle information received in the vehicle information response, that the vehicle does not have a valid registration. For example, the driving operation is prevented if the tax on the vehicle is overdue or the inspection on the vehicle has expired.

In some cases, if the vehicle determines that the vehicle does not have a valid registration, the vehicle can generate a notification. The notification can indicate that the vehicle does not have a valid registration. The vehicle can output the notification through a user interface of the vehicle, e.g., on a screen. The vehicle can request further input from a driver through the user interface. The driver can confirm that the further driving operation of the vehicle is to be prevented. The driver can also indicate that the driving operation can be performed. In some implementation, the driver can indicate that a limited driving operation is to be performed. Examples of the limited driving operation can include a limit on the speed of the vehicle or a driving distance of the vehicle. Examples of the limited driving operation can also include a selected route that the vehicle is allowed to travel. These limited driving operations can enable the vehicle to be moved to a parking lot, a storage facility, or other configured destination.

In some cases, the vehicle can also provide a mechanism for the driver to fix the registration issue. For example, if the vehicle has an overdue tax, the driver can enter payment information through a user interface of the vehicle to pay the tax. After the payment, the vehicle can send another vehicle information request to confirm that the vehicle has a valid registration. In some cases, the vehicle can perform an authentication procedure to verify that the driver is authorized to pay the overdue tax.

In some cases, the vehicle can send the notification to the enterprise server. The notification can trigger a responsive action. Examples of the responsive actions can include sending a command to the vehicle to prevent the driving operation or to limit the driving operation as discussed previously. Examples of the responsive actions can also include sending an alert to an administrator, performing actions to fix the registration issues, or a combination thereof.

In another example, the vehicle can control the driving operation of the vehicle based on the supplemental information of the vehicle. For example, the vehicle can determine a driving route based on the weight or class of the vehicle. Some roads can have restrictions on types of vehicle that can travel on the roads. The vehicle can have access to these restrictions, e.g., stored in a navigation unit of the vehicle or retrieved from a navigation server. The vehicle can determine the driving route based on the weight or class of the vehicle and these restrictions by avoiding the roads that the vehicle is not authorized to travel on. Alternatively or additionally, the supplemental information can include toll payment information, e.g., the type of toll tags or other toll payment mechanism that have been configured for the vehicle. The vehicle can select a driving route that avoids toll roads if the corresponding toll payment is not configured for the vehicle.

In some cases, the vehicle can control the driving operation of the vehicle based on the vehicle information and driver information. In one example, the vehicle can obtain the information of the driver. Examples of the driver information can include license information and insurance information. The driver information can be obtained by user input, e.g., inputted by the driver using a user interface of the vehicle or an electronic device coupled with the vehicle. The driver information can also be obtained through a server. The vehicle can determine whether to prevent the driver from driving the vehicle by comparing the driver information and the vehicle information. For example, the driver information can indicate that the driver is licensed to drive a vehicle of certain class, under certain weight or certain cylinder capacity. The driver information can indicate that the driver is insured for driving a vehicle of certain class, under certain weight or certain cylinder capacity. If the vehicle information indicates that the vehicle has some features (e.g., class, weight, cylinder capacity, or the like) that are beyond the corresponding features that are licensed or insured for the driver, the vehicle can prevent a driving operation of the vehicle by the driver. In some cases, as discussed previously, the vehicle can output a notification, send a notification to a server, or provide a mechanism to fix the issue.

In some cases, a vehicle may provide one or more subscription services. Examples of the subscription services can include navigation service, entertainment services such as satellite radio or TV services, communication services such as cellular network (e.g., 3G, 4G, or 5G) services or WLAN services, or other services that require a subscription or registration. In some implementations, vehicle subscription information can also be queried and received using similar mechanisms to those discussed previously. For example, the vehicle can send a vehicle subscription information request to a server. The vehicle subscription information request can be the same message as the vehicle information request, or a different message. The vehicle subscription information request can also include the ID of the vehicle discussed previously. The vehicle subscription information request can be sent to an enterprise server that stores, or has access to, vehicle subscription information. The enterprise server can be the same enterprise server discussed previously or a different server. The enterprise server can retrieve the vehicle subscription information, and send the vehicle subscription information to the vehicle. The vehicle subscription information can be sent in the same message as the vehicle information response discussed previously, or in a different message. The vehicle can determine the types of services that the vehicle is subscribed to, based on the vehicle subscription information. The vehicle can provide the types of services that are currently subscribed to the vehicle. In some cases, the vehicle can output the vehicle subscription information through a user interface, and receiver user inputs from the driver to further enhance the services, e.g., making additional payments.

FIG. 3 is a high-level architecture block diagram showing a computer 302 coupled with a network 350, according to an implementation. The described illustration is only one possible implementation of the described subject matter and is not intended to limit the disclosure to the single described implementation. Those of ordinary skill in the art will appreciate the fact that the described components can be connected, combined, or used in alternative ways, consistent with this disclosure.

The network 350 facilitates communications between the computer 302 and other devices. In some cases, a user, e.g., an administrator, can access the computer 302 from a remote network. In these or other cases, the network 350 can be a wireless or a wireline network. In some cases, a user can access the computer 302 locally. In these or other cases, the network 350 can also be a memory pipe, a hardware connection, or any internal or external communication paths between the components.

The computer 302 includes a computing system configured to perform the algorithm described in this disclosure. For example, the computer 302 can be used to implement the server 130 shown in FIG. 1. In some cases, the algorithm can be implemented in an executable computing code, e.g., C/C++ executable code. Alternatively, or in combination, the algorithm can be implemented in an application program, e.g., EXCEL. In some cases, the computer 302 can include a standalone LINUX system that runs batch applications. In some cases, the computer 302 can include mobile or personal computers that run the application program.

The computer 302 may include an input device, such as a keypad, keyboard, touch screen, microphone, speech recognition device, or another device that can accept user information, and/or an output device that conveys information associated with the operation of the computer 302, including digital data, visual and/or audio information, or a GUI.

The computer 302 can serve as a client, network component, a server, a database or other persistency, or the like. In some implementations, one or more components of the computer 302 may be configured to operate within a cloud-computing-based environment.

At a high level, the computer 302 is an electronic computing device operable to receive, transmit, process, store, or manage data and information. According to some implementations, the computer 302 may also include or be communicably coupled with an application server, e-mail server, web server, caching server, streaming data server, business intelligence (BI) server, and/or other server.

The computer 302 can receive requests over network 350 from a client application (e.g., executing on a user device) and respond to the received requests by processing said requests in an appropriate software application. In addition, requests may also be sent to the computer 302 from internal users (e.g., from a command console or by another appropriate access method), external or third parties, other automated applications, as well as any other appropriate entities, individuals, systems, or computers.

Each of the components of the computer 302 can communicate using a system bus 303. In some implementations, any and/or all the components of the computer 302, both hardware and/or software, may interface with each other and/or the interface 304 over the system bus 303, using an application programming interface (API) 312 and/or a service layer 313. The API 312 may include specifications for routines, data structures, and object classes. The API 312 may be either computer language-independent or -dependent and refer to a complete interface, a single function, or even a set of APIs. The service layer 313 provides software services to the computer 302. The functionality of the computer 302 may be accessible for all service consumers using this service layer. Software services, such as those provided by the service layer 313, provide reusable, defined business functionalities through a defined interface. For example, the interface may be software written in JAVA, C++, or other suitable language providing data in Extensible Markup Language (XML) format or other suitable format. While illustrated as an integrated component of the computer 302, alternative implementations may illustrate the API 312 and/or the service layer 313 as stand-alone components in relation to other components of the computer 302. Moreover, any or all parts of the API 312 and/or the service layer 313 may be implemented as child or sub-modules of another software module or hardware module, without departing from the scope of this disclosure.

The computer 302 includes an interface 304. Although illustrated as a single interface 304 in FIG. 3, two or more interfaces 304 may be used according to particular needs, configurations, or particular implementations of the computer 302. The interface 304 is used by the computer 302 for communicating with other systems in a distributed environment connected to the network 350—(whether illustrated or not). Generally, the interface 304 comprises logic encoded in software and/or hardware in a suitable combination and operable to communicate with the network 350. More specifically, the interface 304 may comprise software supporting one or more communication protocols associated with communications such that the network 350 or interface's hardware are operable to communicate physical signals.

The computer 302 includes a processor 305. Although illustrated as a single processor 305 in FIG. 3, two or more processors may be used according to particular needs, configurations, or particular implementations of the computer 302. Generally, the processor 305 executes instructions and manipulates data to perform the operations of the computer 302. In some cases, the processor 305 can include a data processing apparatus.

The computer 302 also includes a memory 306 that holds data for the computer 302. Although illustrated as a single memory 306 in FIG. 3, two or more memories may be used according to particular needs, configurations, or particular implementations of the computer 302. While memory 306 is illustrated as an integral component of the computer 302, in alternative implementations, memory 306 can be external to the computer 302.

The application 307 comprises an algorithmic software engine providing functionality according to particular needs, configurations, or particular implementations of the computer 302. Although illustrated as a single application 307, the application 307 may be implemented as multiple applications 307 on the computer 302. In addition, although illustrated as integral to the computer 302, in alternative implementations, the application 307 can be external to the computer 302.

There may be any number of computers 302 associated with, or external to, the system 300 and communicating over network 350. Further, the terms "client," "user," and other appropriate terminology may be used interchangeably, as appropriate, without departing from the scope of this disclosure. Moreover, this disclosure contemplates that many users may use one computer 302, or that one user may use multiple computers 302.

Some of the subject matter and operations described in this disclosure can be implemented in digital electronic circuitry, or in computer software, firmware, or hardware, including the structures described in this disclosure and their structural equivalents, or in combinations of one or more of them. Some of the subject matter described in this disclosure can be implemented as one or more computer programs, i.e., one or more modules of computer program instructions, encoded on a computer storage medium for execution by, or to control the operation of, data-processing apparatus. Alternatively, or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or any combinations of computer-storage mediums.

The terms "data-processing apparatus," "computer," or "electronic computer device" encompass all kinds of apparatus, devices, and machines for processing data, including, by way of example, a programmable processor, a computer, a system on a chip, or multiple ones, or combinations of the foregoing. The apparatus can include special purpose logic circuitry, e.g., an FPGA (field programmable gate array) or an ASIC (application specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable, conventional operating system.

A computer program, which may also be referred to, or described, as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site, or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

Some of the processes and logic flows described in this disclosure can be performed by one or more programmable processors, executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory, or both. A processor can include by way of example a programmable processor, a computer, a system on a chip, or multiple ones, or combinations of the foregoing. A processor can include special purpose logic circuitry, e.g., an FPGA (field programmable gate array) or an ASIC (application specific integrated circuit).

Computers suitable for the execution of a computer program can be based on general or special purpose microprocessors, both, or any other kind of CPU. Generally, a CPU will receive instructions and data from a read-only memory (ROM) or a random-access memory (RAM), or both. The essential elements of a computer are a CPU, for performing or executing instructions, and one or more memory devices, for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including, by way of example, semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry. In some cases, the computer storage medium can be transitory, non-transitory, or a combination thereof.

To provide for interaction with a user, implementations of the subject matter described in this disclosure can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to, and receiving documents from a device that is used by the user, for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this disclosure can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this disclosure, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system, or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, either hardware or software (or a combination of hardware and software), may interface with each other, or the interface using an application programming interface (API), or a service layer (or a combination of API and service layer). The API may include specifications for routines, data structures, and object classes. The API may be either computer language, independent or dependent, and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, or hardware module without departing from the scope of this disclosure.

While this disclosure contains many specific implementation details, these should not be construed as limitations on the scope of any invention or on the scope of what may be claimed, but rather as descriptions of features that may be specific to particular implementations of particular inventions. Certain features that are described in this disclosure in the context of separate implementations can also be implemented, in combination, in a single implementation. Conversely, various features that are described in the context of a single implementation can also be implemented in multiple implementations, separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can, generally, be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the computer-readable medium.

The invention claimed is:

1. A method, comprising:
transmitting, from a vehicle, a vehicle information request to a server, wherein the vehicle information request comprises an identification (ID) of the vehicle;
in response to the vehicle information request, receiving, at the vehicle and from the server, a vehicle information response, wherein the vehicle information response comprises vehicle information of a vehicle that matches the ID of the vehicle;
determining, by the vehicle, whether to prevent a driving operation of the vehicle based on the received vehicle information; and
in response to determining whether to prevent the driving operation based on the received vehicle information, controlling, by at least one hardware processor on the vehicle, an operation of the vehicle.

2. The method of claim 1, wherein the vehicle information comprises vehicle registration information of the vehicle, and the controlling the operation of the vehicle comprises:
determining, by the at least one hardware processor on the vehicle, whether the vehicle has a valid registration based on the vehicle registration information; and
determining, by the at least one hardware processor on the vehicle, whether to prevent the driving operation of the vehicle based on the determining whether the vehicle has the valid registration.

3. The method of claim 2, wherein the vehicle registration information comprises at least one of a vehicle inspection expiration date or a vehicle tax due date.

4. The method of claim 2, further comprising: in response to determining to prevent the driving operation of the vehicle, generating an notification indicating a reason for preventing the driving operation of the vehicle.

5. The method of claim 1, wherein the vehicle information comprises at least one of vehicle weight information or vehicle class information, and the controlling the operation of the vehicle comprises:
determining a route based on the at least one of vehicle weight information or vehicle class information.

6. The method of claim 1, further comprising:
obtaining, at the vehicle, driver information comprising driver insurance information, and wherein the controlling the operation of the vehicle comprises: controlling the operation of the vehicle based on the vehicle information and the driver insurance information.

7. The method of claim 6, wherein the controlling the operation of the vehicle based on the vehicle information and the driver insurance information comprises:
if the driver insurance information indicates that a driver is insured to drive the vehicle having a class and a cylinder capacity indicated in the vehicle information, enabling a start of the vehicle; or
if the driver insurance information indicates that a driver is not insured to drive the vehicle having the class or the cylinder capacity indicated in the vehicle information, preventing the start of the vehicle.

8. A vehicle, comprising:
at least one hardware processor; and
a computer-readable storage medium coupled to the at least one hardware processor and storing programming instructions for execution by the at least one hardware processor, wherein the programming instructions, when executed, cause the at least one hardware processor to perform operations comprising:

transmitting, from the vehicle, a vehicle information request to a server, wherein the vehicle information request comprises an identification (ID) of the vehicle;

in response to the vehicle information request, receiving, at the vehicle, and from the server, a vehicle information response, wherein the vehicle information response comprises vehicle information of a vehicle that matches the ID of the vehicle;

determining, by the vehicle, whether to prevent a driving operation of the vehicle based on the received vehicle information; and in response to determining whether to prevent the driving operation based on the received vehicle information, controlling, by at least one hardware processor on the vehicle, an operation of the vehicle.

9. The vehicle of claim 8, wherein the vehicle information comprises vehicle registration information of the vehicle, and the controlling the operation of the vehicle comprises:

determining, by the at least one hardware processor on the vehicle, whether the vehicle has a valid registration based on the vehicle registration information; and determining, by the at least one hardware processor on the vehicle, whether to prevent the driving operation of the vehicle based on the determining whether the vehicle has the valid registration.

10. The vehicle of claim 9, wherein the vehicle registration information comprises at least one of a vehicle inspection expiration date or a vehicle tax due date.

11. The vehicle of claim 9, the operations further comprising: in response to determining to prevent the driving operation of the vehicle, generating an notification indicating a reason for preventing the driving operation of the vehicle.

12. The vehicle of claim 8, wherein the vehicle information comprises at least one of vehicle weight information or vehicle class information, and the controlling the operation of the vehicle comprises:

determining a route based on the at least one of vehicle weight information or vehicle class information.

13. The vehicle of claim 8, the operations further comprising:

obtaining, at the vehicle, driver information comprising driver insurance information, and wherein the controlling the operation of the vehicle comprises: controlling the operation of the vehicle based on the vehicle information and the driver insurance information.

14. The vehicle of claim 13, wherein the controlling the operation of the vehicle based on the vehicle information and the driver insurance information comprises:

if the driver insurance information indicates that a driver is insured to drive the vehicle having a class and a cylinder capacity indicated in the vehicle information, enabling a start of the vehicle; or if the driver insurance information indicates that a driver is not insured to drive the vehicle having the class or the cylinder capacity indicated in the vehicle information, preventing the start of the vehicle.

15. A computer-readable medium storing instructions which, when executed, cause a computing device to perform operations comprising:

transmitting, from a vehicle, a vehicle information request to a server, wherein the vehicle information request comprises an identification (ID) of the vehicle;

in response to the vehicle information request, receiving, at the vehicle and from the server, a vehicle information response, wherein the vehicle information response comprises vehicle information of a vehicle that matches the ID of the vehicle;

determining, by the vehicle, whether to prevent a driving operation of the vehicle based on the received vehicle information; and in response to determining whether to prevent the driving operation based on the received vehicle information, controlling, by at least one hardware processor on the vehicle, an operation of the vehicle.

16. The computer-readable medium of claim 15, wherein the vehicle information comprises vehicle registration information of the vehicle, and the controlling the operation of the vehicle comprises:

determining, by the at least one hardware processor on the vehicle, whether the vehicle has a valid registration based on the vehicle registration information; and determining, by the at least one hardware processor on the vehicle, whether to prevent the driving operation of the vehicle based on the determining whether the vehicle has the valid registration.

17. The computer-readable medium of claim 16, wherein the vehicle registration information comprises at least one of a vehicle inspection expiration date or a vehicle tax due date.

18. The computer-readable medium of claim 16, the operations further comprising: in response to determining to prevent the driving operation of the vehicle, generating an notification indicating a reason for preventing the driving operation of the vehicle.

19. The computer-readable medium of claim 15, wherein the vehicle information comprises at least one of vehicle weight information or vehicle class information, and the controlling the operation of the vehicle comprises:

determining a route based on the at least one of vehicle weight information or vehicle class information.

20. The computer-readable medium of claim 15, the operations further comprising:

obtaining, at the vehicle, driver information comprising driver insurance information, and wherein the controlling the operation of the vehicle comprises: controlling the operation of the vehicle based on the vehicle information and the driver insurance information.

\* \* \* \* \*